United States Patent
Chen et al.

(10) Patent No.: US 11,157,927 B2
(45) Date of Patent: Oct. 26, 2021

(54) SYSTEM AND METHOD FOR DETERMINING A SERVICE DEMAND IN A SERVICE NETWORK

(71) Applicant: National ICT Australia Limited, Eveleigh (AU)

(72) Inventors: Fang Chen, Alexandria (AU); Yan Xu, Alexandria (AU); Aditya Menon, Alexandria (AU); Chen Cai, Alexandria (AU)

(73) Assignee: National ICT Australia Limited, Eveleigh (AU)

( * ) Notice: Subject to any disclaimer, the term of this patent is extended or adjusted under 35 U.S.C. 154(b) by 577 days.

(21) Appl. No.: 15/775,654

(22) PCT Filed: Nov. 11, 2016

(86) PCT No.: PCT/AU2016/051086
§ 371 (c)(1),
(2) Date: May 11, 2018

(87) PCT Pub. No.: WO2017/079804
PCT Pub. Date: May 18, 2017

(65) Prior Publication Data
US 2018/0349931 A1 Dec. 6, 2018

(30) Foreign Application Priority Data

Nov. 13, 2015 (AU) ................................ 2015904699

(51) Int. Cl.
| | |
|---|---|
| G06Q 10/04 | (2012.01) |
| G06Q 30/02 | (2012.01) |
| G06Q 10/06 | (2012.01) |

(52) U.S. Cl.
CPC ......... *G06Q 30/0202* (2013.01); *G06Q 10/04* (2013.01); *G06Q 10/0631* (2013.01)

(58) Field of Classification Search
None
See application file for complete search history.

(56) References Cited

U.S. PATENT DOCUMENTS

| | | |
|---|---|---|
| 7,920,960 B2 | 4/2011 | Liu et al. |
| 2005/0060395 A1 | 3/2005 | Korotky |
| | (Continued) | |

FOREIGN PATENT DOCUMENTS

| | | | |
|---|---|---|---|
| WO | WO 2011/066468 A1 | 6/2011 | |
| WO | WO 2015/039182 A1 | 3/2015 | |

OTHER PUBLICATIONS

Anders Peterson, The Origin-Destination Matrix Estimation Problem—Analysis and Computations, 2007, Linkoping Studies in Science and Technology, Dissertations, No. 1102. ISBN 978-91-85831-95-1 (Year: 2007).*

(Continued)

*Primary Examiner* — Cory W Eskridge
(74) *Attorney, Agent, or Firm* — Crowell & Moring LLP

(57) ABSTRACT

A computer-implemented method, software and system for determining a service demand in a service network are disclosed. A first information indicative of prior proportion knowledge of elements of the service demand is received. Two or more elements of the service demand represent service volumes for two or more pairs of zones and the first information indicates reference relative relationships between the two or more elements of the service demand. Second information indicative of instances of service at specific locations in the service network are received. The service demand is determined by minimising a cost function. The cost function is based on the first information and the second information.

7 Claims, 8 Drawing Sheets

(56) References Cited

U.S. PATENT DOCUMENTS

2014/0089036 A1    3/2014  Chidlovskii
2014/0149493 A1    5/2014  Acer et al.

OTHER PUBLICATIONS

Bera, Sharminda, et al., "Estimation of origin-destination matrix from traffic counts: the state of the art," European Transport\Trasporti Europei, n. 49 (2011): 3-23, 21 pgs.

Doblas, Javier, et al., "An approach to estimating and updating origin-destination matrices based upon traffic counts preserving the prior structure of a survey matrix," Transportation Research Part B, 39 (2005), pp. 565-591.

Extended European Search Report from corresponding European application No. 16863238.8, dated Feb. 19, 2019.

International Search Report for International application No. PCT/AU2016/051086, dated Dec. 5, 2016.

Liang, Gang, et al., "A Fast Lightweight Approach to Origin-Destination IP Traffic Estimation Using Partial Measurements," UCI Donald Bren School of Information & Computer Sciences, Department of Statistics, University of California, Irvine, Jun. 1, 2005, 15 pgs.

Spiess, Heinz, "A Gradient Approach for the O-D Matrix Adjustment Problem," retrieved from the Internet Jun. 28, 2016; URL:https://www.inrosoftware.com/assets/pres-pap/papers/demandj.pdf.

Written Opinion of the International Searching Authority for International application No. PCT/AU2016/051086, dated Dec. 5, 2016.

Examination Report for corresponding European application No. 16863238.8, dated Apr. 9, 2020, 6 pages.

\* cited by examiner

400

(a)

(b)

(a)

(b)

(c)

(d)

SYSTEM AND METHOD FOR DETERMINING A SERVICE DEMAND IN A SERVICE NETWORK

CROSS-REFERENCE TO RELATED APPLICATIONS

The present application is the U.S. National Stage application of PCT Application No. PCT/AU2016/051086, filed on Nov. 11, 2016, designating the United States, which claims priority to Australian Patent Application 2015904699, filed Nov. 13, 2015, of which the contents of all such applications are incorporated herein by reference.

TECHNICAL FIELD

The present disclosure relates to determining a service demand. In particular, the present disclosure relates to a computer-implemented method, software and system for determining a service demand in a service network.

BACKGROUND

An origin-destination (OD) matrix provides an aggregate and concise way to describe an overall service demand condition in a service network during a period of time. The OD matrix is essential for service planning and service management in the service network. However, the determination of OD matrix is challenging due to its inherent unobservability. Further, the determination of OD matrix is generally executed given only observations on the service network, for example observed service instances on the service network.

The approaches to determining the service demand represented by the OD matrix include maximum entropy (Inoue, 1977; Van Zuylen and Willumsen, 1980), maximum likelihood (Spiess, 1987), generalized least squares (Cascetta, 1984; Bell, 1991) and Bayesian inference estimation techniques (Maher, 1983). Recent progress includes the sparsity method (Donoho 2006; Sanandaji, 2014; Menon et al., 2015) and the utilisation of the covariance matrix of observed flows over a sequence of days (Hazelton, 2003). More approaches in relation to determining the service demand can be found in Cascetta and Nguyen, 1988 and Bera, 2011.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

There is provided a computer-implemented method for determining a service demand in a service network, the method comprising:
receiving first information indicative of prior proportion knowledge of elements of the service demand, wherein two or more elements of the service demand represent service volumes for two or more pairs of zones and the first information indicates reference relative relationships between the two or more elements of the service demand;
receiving second information indicative of instances of service at specific locations in the service network; and
determining the service demand by minimising a cost function, wherein the cost function is based on the first information and the second information.

In the above method, the first information indicates reference relative relationships between the two or more elements of the service demand, wherein the two or more elements of the service demand represent service volumes for the two or more pairs of zones. Therefore, it is not necessary to use absolute service volumes given that it is impractical to obtain the absolute and accurate service volumes in a convenient and economical way.

Further, it is an advantage that the first information is easily accessible from surveys. This is in contrast to previous service demand determination methods, which require a prior service demand matrix of high quality, which is can be very costly to obtain. Therefore, the present disclosure offers a cost-efficient way to accurately determine the service demand matrix, especially in large-scale service networks.

The cost function may comprise a first measure of match between the service demand and a reference service demand, wherein the reference service demand is calculated based on the service demand and the first information.

The cost function may further comprise:
a second measure of match between the second information and an approximation of the second information.

The cost function is convex with respect to the elements of the service demand. It is an advantage that the present disclosure may ensure a unique and optimal service demand.

The first measure of match may be scalable. The relative weights of the first measure of match and the second measure of match are configurable by a parameter. The parameter controls the weight of the first measure of match and rebalance these two measures of match.

The approximation of the second information may be calculated based on an assignment map and the service demand. The assignment map may be dependent on the service demand in the service network. The assignment map may also assume user equilibrium for link choice behaviour.

The first information may be determined based on census data or household survey data.

The second information may be received from one or more service detectors installed in the service network.

The service network may comprise one of a transport network and a computer network.

There is provided a computer-implemented method for determining a service demand in a service network, the method comprising:
(a) receiving first information indicative of prior proportion knowledge of elements of the service demand, wherein two or more elements of the service demand represent service volumes for two or more pairs of zones and the first information indicates reference relative relationships between the two or more elements of the service demand;
(b) receiving second information indicative of instances of service at specific locations in the service network;
(c) receiving a reference service demand and an assignment map;
(d) determining an approximation of the second information based on the reference service demand and the assignment map;

(e) determining a first service demand by minimising a cost function, wherein the cost function is based on the first information, the second information, the assignment map and the approximation of the second information;

(f) updating the assignment map and the approximation of the second information based on the first service demand;

(g) if a measure of match between the first service demand and the reference service demand does not meet a target, updating the reference service demand to the first service demand, and repeating (e) to (f); and (h) if the measure of match meets the target, determining the first service demand to be the service demand in the service network.

There is provided a computer software program, including machine-readable instructions, when executed by a processor, causes the computer to perform any one of the methods described above.

There is provided a computer system for determining demand in a service network, the computer system comprising:
a data port to receive first information indicative of prior proportion knowledge of elements of the service demand, and second information indicative of instances of service at specific locations in the service network, wherein two or more elements of the service demand represent service volumes for two or more pairs of zones and the first information indicates reference relative relationships between the two or more elements of the service demand; and
a processor to determine the service demand by minimising a cost function, wherein the cost function is based on the first information and the second information.

There is provided a computer system for determining demand in a service network, the computer system comprising:
a data port to
receive first information indicative of prior proportion knowledge of elements of the service demand, wherein two or more elements of the service demand represent service volumes for two or more pairs of zones and the first information indicates reference relative relationships between the two or more elements of the service demand;
receive second information indicative of instances of service at specific locations in the service network; and
receive a reference service demand and an assignment map; and
a processor to
(a) determine an approximation of the second information based on the reference service demand and the assignment map;
(b) determine a first service demand by minimising a cost function, wherein the cost function is based on the first information, the second information, the assignment map and the approximation of the second information;
(c) update the assignment map and the approximation of the second information based on the first service demand;
(d) if a measure of match between the first service demand and the reference service demand does not meet a target, updating the reference service demand to the first service demand, and repeating (b) to (c); and
(e) if the measure of match meets the target, determine the first service demand to be the service demand in the service network.

BRIEF DESCRIPTION OF THE DRAWINGS

Features of the present disclosure are illustrated by way of non-limiting examples. The examples will be described with reference to the following figures in which.

BEST MODES OF THE INVENTION

Figure 1:
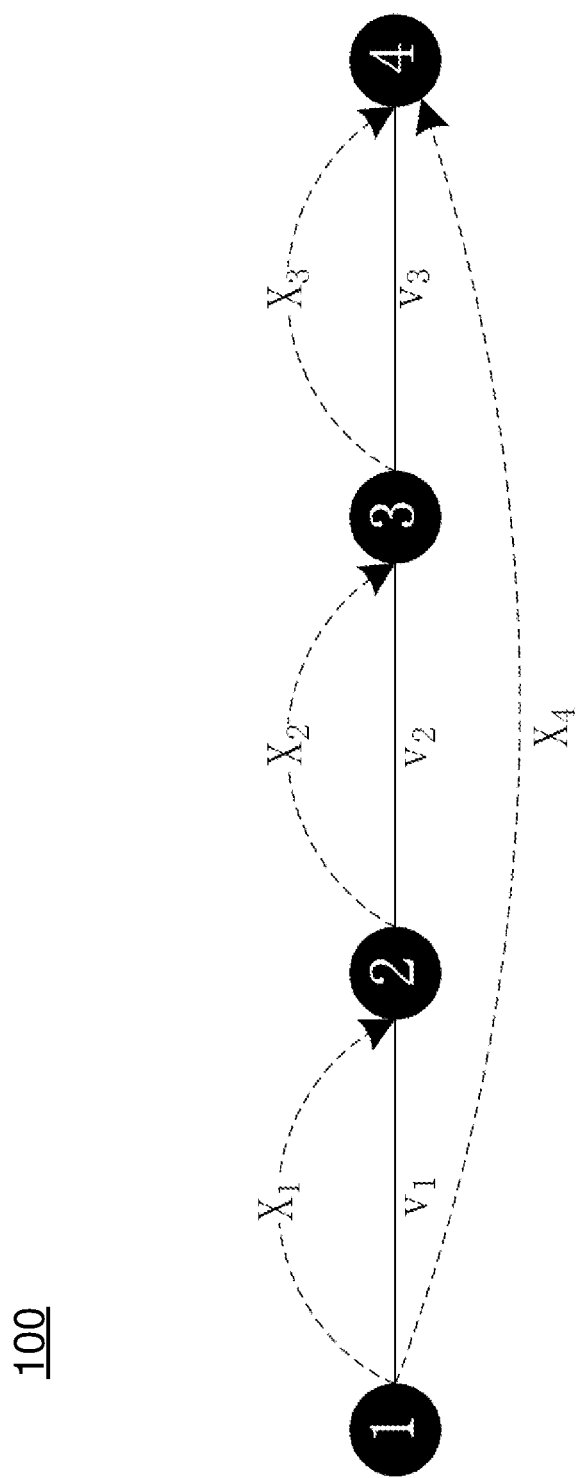
FIG. 1 illustrates an example service network in accordance with the present disclosure.

A service network in the present disclosure refers to a network that provides a certain type of service. For example, the service network may include a transport network that provides transportation services for vehicles, and a computer network that provides data package transmission services between computers. The service network may include other networks without departing from the scope of the present disclosure.

A service network may include one or more zones. The one or more zones are geographic or logical areas that are covered by the service network. Within the zones, there are one or more nodes and one or more links. A link in the service network connects two nodes in a same zone or different zones. The service provided by the service network "flows" on the links, which can be a vehicle transportation service or a data package transmission service. Instances of the service on a link (i.e., occurrences of provision of the service on the link) may be recorded by a service detector installed at a location in the service network. In a transport network, the service detector can be a vehicle counter. The specific locations where the vehicle counters are installed in a transport network may be different. For example, the vehicle counters can be installed in the middle of a road or at the end of the road. On the other hand, in a computer network, the service detector can be a data package counter running on a router in the computer network.

A service volume (also referred to as "link flow") in the present disclosure measures a service demand condition between a pair of zones, i.e., two zones, in the service network. That is, the service volume reflects how frequently the service is demanded between the pair of zones. It should be noted that the service volume from a zone (zone 1) to another zone (zone 2) in a service network may be different to the service volume from zone 2 to zone 1. Since there may be more than one link between a pair of zones, the service volume for the pair of zones is a sum of instances of service (i.e., the total instances of service) on all the links of the same direction between the two zones. An assignment map is introduced in the present disclosure to describe allocation of the service volume between the two zones on the links, particularly, at specific locations where the service detectors are installed in the service network.

A service demand in a service network reflects the overall service demand condition in the service network. The service demand can be represented by a matrix having two or more elements with each element representing the service volume for a pair of zones in the service network, for example, from a zone (origin zone) to another zone (destination zone). The matrix is referred to as the OD matrix in the present disclosure.

In a transport network, a node is an intersection where two or more roads intersect, or an end of a road. Therefore, a road segment between two nodes can be regarded as a link. Instances of service on a road segment may be represented by the number of vehicles that travel from a node of the road segment to another node of the road segment during a period of time. Zones in a transport network can be considered as suburbs covered by the transport network. Accordingly, a service volume from zone 1 to zone 2 may be represented by the number of vehicles that travel from suburb 1 to suburb 2 during a period of time. Accordingly, each of the elements of the OD matrix for the transport network reflects the number of vehicles that travel from an origin suburb to a destination suburb during the period of time.

In a computer network, a node is a router in the computer network. And a data communication path between two routers is a link. Service instances on a communication path may be represented by the number of data packages that are communicated from a router of the communication paths to another router of the communication path during a period of time. Zones in a computer network can be considered as domains in the computer network or geographic areas covered by the computer network. A service volume from zone 1 to zone 2 may be represented by the number of data packages that are transmitted from zone 1 to zone 2 during a period of time. Accordingly, each of the elements of the OD matrix for the computer network reflects the number of data packages that are transmitted from an origin zone to a destination zone during a period of time.

General Formulation of Determining a Service Demand and Previous Approaches

The general formulation for determining a service demand in a service network is $$\min_X F_1(X, \overline{X}) + F_2(V, \overline{V}) \quad (1a)$$

subject to the constraints $$X \geq 0; \quad (1b)$$

$$V = PX \quad (1c)$$

where
- $\overline{X}$ is the prior knowledge of the true Origin-Destination (OD) matrix (i.e. the target OD matrix), which is represented by a column vector (the term "OD matrix" and the term "OD vector" may be used interchangeably in the present disclosure);
- X is the service demand to be determined or estimated, i.e., an unknown OD matrix;
- $\overline{V}$ indicates the instances of service on the service network that are recorded by the service detectors installed in the service network, which are also referred to as observed service instances;
- V is an approximation of service instances on the service network; and
- P is an assignment map, which may be a matrix. Each element of the matrix $p_{ij}$ represents the proportion of the service volume between two zones in an OD pair $x_j : \{x_j \in X\}$ that is performed on link i.

FIG. 1 illustrates an example of a service network 100 with four nodes (or four zones since only one node is included in each zone in this example), three links and four OD pairs $X : \{x_1, x_2, x_3, x_4\}$. The observed service instances are represented by a vector $\overline{V} : \{v_1, v_2, v_3\}$. For ease of description, the service network 100 is described below as a transport network, but the service network 100 can be a computer network or other networks without departing from the scope of the present disclosure.

In this general formulation represented by equation (1a), $F_2(V, \overline{V})$ measures a difference between the service instances $\overline{V}$ and the service instances approximation V. This difference is representative of an error or distance between $\overline{V}$ and V. Therefore, a smaller value of $F_2(V, \overline{V})$ represents a better estimate of the OD matrix. However, the number of links is typically smaller than the number of elements in the OD matrix. This means that it is impossible to determine a unique optimal OD matrix X, i.e. the problem is indeterminate. The problem of indeterminacy is further worsened given that the service instances $\overline{V}$ are not necessarily independent.

The addition of $F_1(X, \overline{X})$ in equation (1a) alleviates the problem of indeterminacy. $F_1; (X, \overline{X})$ measures an error or distance between the estimated service demand represented by the OD matrix X and the prior knowledge of the service demand represented by the OD matrix $\overline{X}$. Examples of $F_1(X, \overline{X})$ and $F_2(V, \overline{V})$ include maximum entropy (Van Zuylen and Willumsen, 1980) and generalised least squares (GLS) (Cascetta and Nguyen, 1988), respectively, as shown below:

$$\text{Entropy}(X, Y) = -\Sigma_i \left( \frac{X_i * \log X_i}{Y_i} - X_i + Y_i \right) \quad (2)$$

$$GLS(X, Y) = (X - Y)^T * W^{-1} * (X - Y) \quad (3)$$

where
- vector X represents the service instances approximation and vector Y means the service instances. $X_i$, $Y_i$ are the ith elements in X, Y;
- W is the variance-covariance matrix of random error terms in Y (e.g. service instances). In the present disclosure, W is full rank and $W^{-1}$ is valid.

In the above examples, $F_1(X, \overline{X})$ and $F_2(V, \overline{V})$ are convex with respect to x: $\{x \in X\}$ and v: $\{v \in V\}$. If the assignment map P is fixed and given, equation (1a) becomes strictly convex with x: $\{x \in X\}$ and a unique OD matrix is guaranteed.

However, the assignment map P depends on the unique OD matrix. In general, an assignment map P in a congested condition may be different from an assignment map in an un-congested condition for the same service network. The consequence is that the assignment map P must be estimated together with X.

A practical strategy to deal with the interdependence between P and X is the bi-level programming framework (Yang, 1992). There are two functions in the bi-level programming framework: an upper-level function and a lower-level function. The upper-level function is equation (1a) with P fixed; while the lower-level function determines the optimal P given X fixed with additional assumptions about route choice behaviours. A common assumption for route choice behaviours is user equilibrium (Ortuzar, 2011). With the assumption of user equilibrium, the lower-level function becomes a nonlinear optimization problem to determine the user equilibrium link flows given X fixed (Beckmann et al., 1956). The nonlinear problem can be solved by the Frank-Wolfe algorithm (Frank and Wolfe, 1956). It is concluded in (Yang, 1992) that if a high-quality prior OD matrix, which is close enough to the true OD matrix, is available, the bi-level programming framework should, in most cases, be able to identify the optimal OD matrix. Therefore, the availability of the true or high-quality OD matrix is important to the current solution framework in static OD estimation.

If the high-quality OD matrix is not available, which is not uncommon (e.g., a particular service network that has not been investigated before, the previous true OD matrix has expired, or the information is simply not available), the general formulation (1) becomes:

$$\min_X F_3(X) + F_2(V, \overline{V}) \quad (4a)$$

subject to:

$$X \geq 0 \quad (4b)$$

$$V = PX; \quad (4c)$$

Due to unavailability of the high-quality OD matrix, $F_1(X, \overline{X})$ becomes immeasurable. As a result, $F_3(X)$ becomes a function that measures the difference between the estimated OD matrix X and the assumed structure or knowledge of the true OD matrix. In this case, the role of $F_3(X)$ is similar to $F_1(X, \overline{X})$, which guarantees there is an optimal solution. A satisfied function $F_3(X)$ should make the objective function (4a) convex with respect to X in a non-negative feasible solution space. In the present disclosure, both $F_3(X)$ without prior information and $F_3(X)$ with prior information are considered.

An example of function $F_3(X)$ without prior information is maximum entropy. The maximum entropy approach is used in a wide range of transport models (e.g. the gravity model, see (Ortuzar, 2011) for detailed description. The key assumption of this approach is that, unless information to the contrary is available, all possible micro states that are consistent with the macro aggregated information are equally likely to occur. More specifically, the maximum entropy approach finds an OD matrix that maximises the function $W\{X\}$.

$$W\{X\} = X!/\Pi_i x_i! \quad (5)$$

In the service network 100, as described above with reference to FIG. 1, there are four zones, three links, and four OD pairs $\{x_1, x_2, x_3, x_4\}$. Given instances of service on links of the service network 100 $\overline{V}$: $\{v_1=10, v_2=10, v_3=10\}$ and three candidate OD matrices (shown below), the maximum entropy approach identifies the OD matrix (1) as the optimal OD matrix since OD matrix (1) maximises function w $\{X\}$.

$$\{x_1=5, x_2=5, x_3=5, x_4=5\} \quad \text{OD Matrix (1)}$$

$$\{x_1=2, x_2=2, x_3=2, x_4=8\} \quad \text{OD Matrix (2)}$$

$$\{x_1=0, x_2=0, x_3=0, x_4=10\} \quad \text{OD Matrix (2)}$$

The maximum entropy approach provides a reasonable estimate of the true OD matrix in small-scale service networks with homogeneous zones. However, the maximum entropy approach is not able to provide satisfying OD matrix in large-scale service networks with heterogeneous zones. For example, in a large-scale transport network, there are normally a number of hot-spot zones (for example, in a CBD area) and a number of silent zones (e.g. in national parks and forest areas).

In the example shown in FIG. 1, if zone 4 represents a CBD area, zone 1 represents a residential area and zones 2, 3 are silent zones, it is clear that OD matrices (2) and (3) outperform OD matrix (1). This is consistent with the traffic pattern in this scenario. As a result, the maximum entropy approach may not be able to find the reasonable OD matrix in the service network.

Another example of function $F_3(X)$ without prior information is the sparsity function. The key assumption of this approach is that most of elements in an OD matrix are zeroes. More specifically, the sparsity function approach finds an OD matrix that has the minimum number of non-zero elements (Sanandaji, 2014; Menon et al., 2015). However, there are two problems with this approach. Firstly, the sparsity function ($l_0$ regularization or $l_1$ regularization) is not strictly convex with respect to x: $\{x \in X\}$. Thus, an optimal OD matrix is not guaranteed. Secondly, the assumption of sparsity may not be applicable in a large-scale service network.

In order to alleviate the problem of indeterminacy and reduce the weight of $F_3(X)$, $F_2(V, \overline{V})$ may be generalised by combining the covariance matrix of instances of service over a sequence of days.

However, the idea of using second-order statistical properties of observed data (Hazelton, 2003) is not without problems. Firstly, it is not easy to find a number of days with $\{X^{(1)}, X^{(2)}, X^{(3)}, \ldots X^{(n)}\}$ that are independent and identically distributed in a large-scale service network. This is due to various activities and events, weather and inherent demand variation, etc. Secondly, the function generalised by use of second-order statistical properties may be non-convex with respect to x: $\{x \in X\}$. Thirdly, an assumption on mean-variance relationship on elements of the OD matrix is required.

An Example Method

Figure 2:
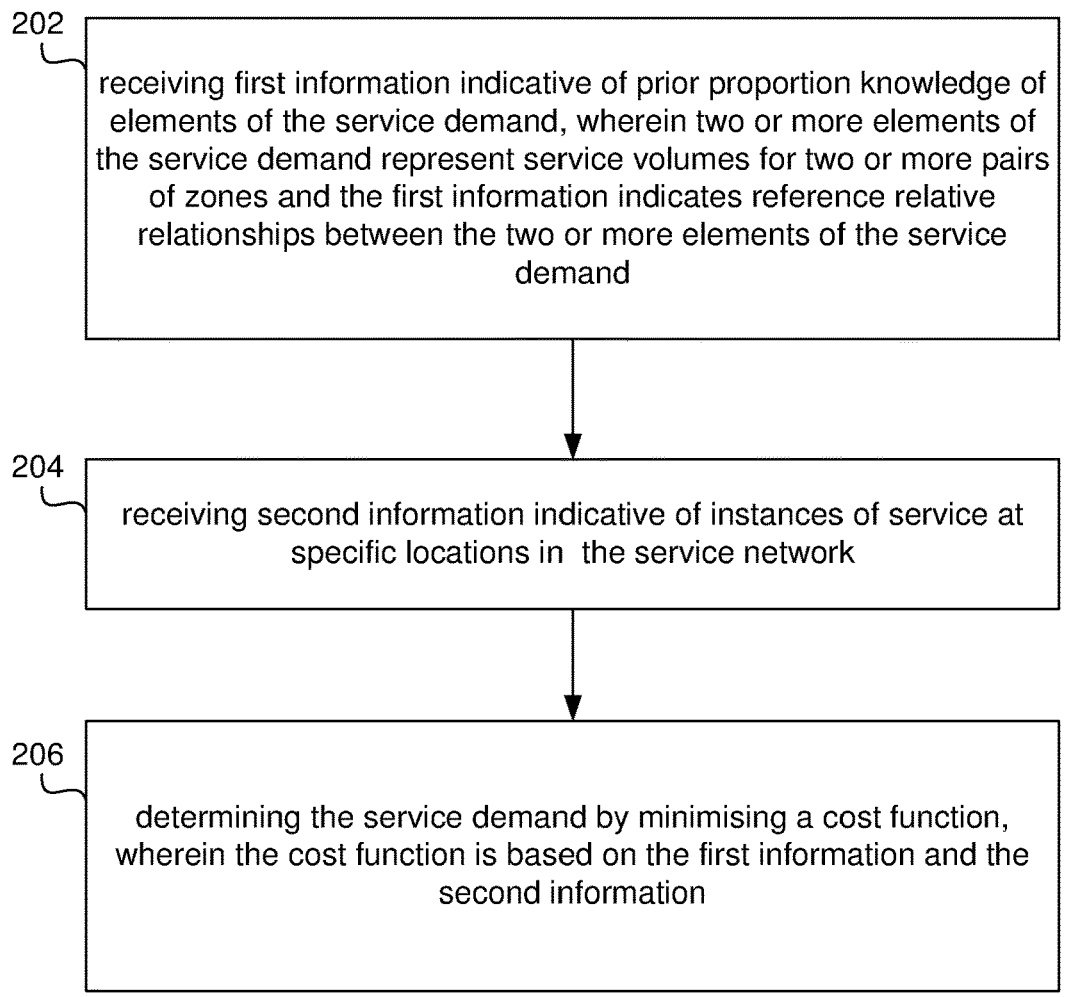
FIG. 2 illustrates an example method for determining a service demand in the service network in accordance with the present disclosure.

FIG. 2 illustrates an example method 200 for determining a service demand in the service network 100. The method 200 as shown in FIG. 2 does not require a true service demand represented by a true OD matrix for the service network 100.

The method 200 receives 202 first information indicative of prior proportion knowledge of elements of the service demand. The service demand is represented by an OD matrix X. As described above, the elements of the OD matrix X represent service volumes (particularly, traffic volumes in this example) for the two or more pairs of zones. Further, the first information indicates reference relative relationships between the elements (or the service volumes) and is represented by a matrix $G\{g_1, g_2, g_3, g_4\}$.

An example of the prior proportion knowledge matrix G is G:$\{g_1=0.1, g_2=0.3, g_3=0.2, g_4=0.4\}$. Each element in the prior proportion knowledge matrix G is indicative of reference relative relationships between the elements (or service volumes) of the OD matrix. The term "reference relative relationship" in the present disclosure means that:

1. Each element $\{g_i, i=1, 2, 3, 4\}$ in the prior proportion knowledge matrix G does not represent the absolute service volume for the two zones. Ideally, each element in the prior proportion knowledge matrix G represents a proportion of the corresponding element of the true OD matrix relative to the sum of traffic volumes represented in the true OD matrix. For example, with reference to the service network 100 shown in FIG. 1, $g_1=0.1$ means the service volume from zone 1 to zone 2 (i.e., $x_1$) is one tenth of the total service volume in the service network 100, while $g_2=0.3$ means the service volume from zone 2 to zone 3 (i.e., $x_2$) is three tenths of the total service volume.
2. However, it is hard to obtain the true OD matrix in reality, as described above. As a result, it is hard to obtain the true prior proportion knowledge matrix G. Therefore, the prior proportion knowledge matrix G is determined from census data or household survey data in the present disclosure. For example, matrix G may be estimated using information that includes the number of commuting trips, the number of households, and the general daily activities occurring in the service network 100. The census information is easily obtainable from the government agencies, for example the Australian Bureau of Statistics or the United States Census Bureau. Therefore, each element in the prior proportion knowledge matrix G does not represent the true OD matrix, but a reference relative relationship between the elements of the OD matrix to be determined for the method 200 to determine the OD matrix in an optimal sense.

The method 200 receives 204 second information indicative of instances $\bar{V}$ of service at specific locations in the service network 100. The second information $\bar{V}$ represents instances of service on links in the service network 100 that are recorded by service detectors. In this example, the service network 100 as shown in FIG. 1 is a transport network, and the service detectors are installed on the links between zone 1 and zone 2, zone 2 and zone 3, and zone 3 and zone 4, respectively, in order to record the instances of service on the service network 100. For example, the numbers of vehicles are recorded that travel on the links during a period of time. An example of the second information is matrix $\bar{V}$:$\{v_1=10, v_2=10, v_3=10\}$. In matrix $\bar{V}$, $v_1=10$ means that there are 10 vehicles traveling on the link from zone 1 to zone 2 during an observation period of time. The second information may be received from the service detectors.

The method 200 determines 206 the service demand or OD matrix X by optimising, particularly, minimising, a cost function, wherein the cost function is based on the first information and the second information. The cost function will be described with reference to the following hypothesis.

Hypothesis: Given the assignment map P and the instances of service $\bar{V}$ are fixed, if $|X|>|V|$ and there are a number of OD matrices $\{X^1, X^2, X^3, \ldots, X^m\}$ satisfying $\bar{V}=PX$, the OD matrix X that minimises function $F_3(X)$ is the optimal OD matrix.

$$F_3(X) = \sum_i (x_i - \|X\|_1 * g_i)^2 \quad (6)$$

where

|X| denotes the length of vector X, which is the number of OD pairs or the number of elements in the OD matrix. $\|X\|$ denotes the sum of the elements of the OD matrix X representing the service demand in the service network 100. That is, $\|X\|$ represents the total service volume in the service network 100;

G is a $|X|*1$ vector, or the prior proportion knowledge matrix, $g_i$:$\{g_i \in G\}$, representing reference relative relationships between the two or more elements of the OD matrix for the service network 100, as described above.

Combining the hypothesis with equation (4a), the cost function to be minimised in 206 in the method 200 is $$\min_X \quad \lambda * \sum_i (x_i - \|X\|_1 * g_i)^2 + \sum_i (v_i - \bar{v}_i)^2 \quad (7a)$$

subject to:

$$X \geq 0 \quad (7b)$$

$$V = PX. \quad (7c)$$

It can be seen from above that the cost function (7a) includes a first measure of match (the first item in equation (7a)) between the service demand X and a reference service demand. The reference service demand is calculated based on the service demand and the first information, particularly, the elements of the reference service demand are represented by $\|X\|_1 * g_i$. Further, the cost function (7a) also includes a second measure of match (the second item in equation (7a)) between the second information and $\bar{V}$ and an approximation V of the second information $\bar{V}$. As shown in the cost function (7a), the first measure of match includes a difference between the service demand X and the reference service demand.

As can be seen from the cost function (7a), the first measure of match is scalable since the first measure of match is adjusted by a parameter $\lambda$. $\lambda$ is a positive configurable parameter. This parameter controls the weight of the first measure of match and its influence on the cost function (7a). A practical strategy is to have a pre-determined set of values (e.g. 0.1, 0.3, 1.0) and pick the one with an reasonable weight on the first measure of match.

As can be seen from the equation (7c), the approximation V of the second information $\bar{V}$ is calculated based on the assignment map P and the service demand X. The assignment map P may be dependent on the service demand X in the service network. The assignment map P may also assume user equilibrium for link choice behaviour.

The cost function (7a) can be further vectorised as:

$$\min_X \begin{bmatrix} P*X - \bar{V} \\ U*X - O \end{bmatrix}^T * \begin{bmatrix} I & O \\ O & \lambda \end{bmatrix} * \begin{bmatrix} P*X - \bar{V} \\ U*X - O \end{bmatrix} \quad (8a)$$

subject to $$X \geq 0 \quad (8b)$$

where the assignment map P and the second information $\bar{V}$ are fixed; O is a zero matrix; I is an identity matrix; $\lambda$ is a diagonal matrix; U is a |X|*|X| matrix, which is a matrix form of the first information G:

$$U = \begin{bmatrix} 1-g_1, & -g_1, & \ldots & -g_1 \\ -g_2, & 1-g_2, & \ldots & -g_2 \\ \ldots & \ldots & \ldots & \ldots \\ -g_{|X|}, & -g_{|X|}, & \ldots & 1-g_{|X|} \end{bmatrix}.$$

Properties of the cost function (7a) are described below:
- a least square difference is used in the cost function (7a). However, if the variance-covariance matrix of the observations is available, a generalized least square difference can be used;
- both the first measure of match and the second measure of match are essentially least square difference functions and thus are convex with respect to x: $\{x \in X\}$. Since the nonnegative linear combination of convex functions is still convex, the cost function (7a) is convex with respect to x: $\{x \in X\}$; and
- the first measure of match provides $|X|-1$ independent equations and the second information $\nabla$ provides M: $\{M \geq 1\}$ additional independent equations. The number of independent equations is not smaller than the number of parameters. Therefore, the problem of indeterminacy does not exist in the cost function (7a). In other words, the cost function (7) always has a unique solution, for the OD matrix X.

The cost function (7a) does not require an accurate prior proportion knowledge matrix G. Even with an inaccurate matrix G, the cost function (7a) guarantees its convexity and determination. The impact of the accuracy of G on the unique solution is also described below in the present disclosure.

If equal proportions are given to all items in G, the function $F_3(X)$ becomes:

$$F_3(X) = \Sigma_i(x_i - E(X))^2 = \text{var}(X) \quad (9)$$

In this case, the hypothesis is to minimise the variance of X. Therefore, without information to the contrary, the hypothesis aims to assign the same value to all OD pairs in the OD matrix X.

If using the standard $l_2$ regularization, the function $F_3(X)$ becomes:

$$F_3(X) = \Sigma_i(x_i)^2 \quad (10)$$

Therefore, the standard $l_2$ regularization can be considered as a special case of the hypothesis with all elements in G being zero (Bishop, 2006).

An example of application of the hypothesis is described below with reference to the service network 100 shown in FIG. 1.

The prior proportion knowledge matrix G (i.e. the first information):

$$G = \begin{bmatrix} 10\% \\ 10\% \\ 10\% \\ 70\% \end{bmatrix}.$$

The instances of services $\nabla$ on the service network 100 (i.e. the second information)

$$\overline{V} = \begin{bmatrix} 10 \\ 10 \\ 10 \end{bmatrix}$$

the assignment map P $$P = \begin{bmatrix} 1, & 0, & 0, & 1 \\ 0, & 1, & 0, & 1 \\ 0, & 0, & 1, & 1 \end{bmatrix}.$$

The service demand or the OD matrix X to be determined $$X = \begin{bmatrix} x_1 \\ x_2 \\ x_3 \\ x_4 \end{bmatrix}.$$

The values of $F_3(X)$ for the respective candidates X are:

$$F_3\left(\begin{bmatrix} 2 \\ 2 \\ 2 \\ 8 \end{bmatrix}\right) =$$

$$(2-14*0.1)^2 + (2-14*0.1)^2 + (2-14*0.1)^2 + (8-14*0.7)^2 =$$
$$0.6^2 + 0.6^2 + 0.6^2 + 1.8^2 = 4.32$$

$$F_3\left(\begin{bmatrix} 5 \\ 5 \\ 5 \\ 5 \end{bmatrix}\right) = (5-20*0.1)^2 + (5-20*0.1)^2 + (5-20*0.1)^2 +$$

$$(5-20*0.7)^2 = 3^2 + 3^2 + 3^2 + 9^2 = 108$$

$$F_3\left(\begin{bmatrix} 0 \\ 0 \\ 0 \\ 10 \end{bmatrix}\right) = (0-10*0.1)^2 + (0-10*0.1)^2 + (0-10*0.1)^2 +$$

$$(10-10*0.7)^2 = 1^2 + 1^2 + 1^2 + 3^2 = 12.$$

Therefore, the unique the OD matrix X that satisfies the hypothesis is x={2, 2, 2, 8} since the OD matrix X={2, 2, 2, 8} minimises $F_3(X)$.

As can be seen from the above, the benefits of the hypothesis include:
- the three candidate OD matrices, which are not distinguishable solely based on the second measure of match, become differentiable by the hypothesis; and
- the OD matrix, which matches the traffic pattern best in this scenario, is determined as the optimal OD matrix.

Since it is not easy to derive an analytical solution to the least square model with nonnegative constraints, it is assumed that the cost function (7a) is not subject to the non-negative constrains represented by equation (7b).

Given the cost function (7a) is convex with respect to x: $\{x \in X\}$, the analytical solution of the model without the non-negative constraints can be obtained by equating the first partial derivatives with respect to x: {x∈X} to zero. The analytical solution is:

$$X=(P^T*P+\lambda*U^T*U)^{-1}*(P^T*\overline{V}) \quad (11)$$

Given matrix U as below:

$$U = \begin{bmatrix} 0.9 & -0.1 & -0.1 & -0.1 \\ -0.1 & 0.9 & -0.1 & -0.1 \\ -0.1 & -0.1 & 0.9 & -0.1 \\ -0.7 & -0.7 & -0.7 & 0.3 \end{bmatrix}.$$

Then the optimal OD matrix X can be obtained from equation (11) as follows:

$$X = \text{Inverse}\left(\begin{bmatrix} 1, & 0, & 0, & 1 \\ 0, & 1, & 0, & 1 \\ 0, & 0, & 1, & 1 \end{bmatrix}^T * \right.$$

$$\begin{bmatrix} 1, & 0, & 0, & 1 \\ 0, & 1, & 0, & 1 \\ 0, & 0, & 1, & 1 \end{bmatrix} + 0.1 * \begin{bmatrix} 0.9 & -0.1 & -0.1 & -0.1 \\ -0.1 & 0.9 & -0.1 & -0.1 \\ -0.1 & -0.1 & 0.9 & -0.1 \\ -0.7 & -0.7 & -0.7 & 0.3 \end{bmatrix}^T *$$

$$\left.\begin{bmatrix} 0.9 & -0.1 & -0.1 & -0.1 \\ -0.1 & 0.9 & -0.1 & -0.1 \\ -0.1 & -0.1 & 0.9 & -0.1 \\ -0.7 & -0.7 & -0.7 & 0.3 \end{bmatrix}\right) *$$

$$\left(\begin{bmatrix} 1, & 0, & 0, & 1 \\ 0, & 1, & 0, & 1 \\ 0, & 0, & 1, & 1 \end{bmatrix}^T * \begin{bmatrix} 10 \\ 10 \\ 10 \end{bmatrix}\right) = \begin{bmatrix} 1.25 \\ 1.25 \\ 1.25 \\ 8.75 \end{bmatrix}.$$

In this particular example, even if the cost function (7a) is subject to the non-negative constraints (7b), the above OD matrix is the optimal OD matrix since all the elements is greater than zero.

If the cost function (7a) is subject to the non-negative constraints represented by equation (7b), the analytical solution may not be valid. In this sense, the analytical solution may be used for theoretical analysis. Numerical solutions (e.g. gradient descent) are used to solve the cost function (7a) with non-negative constraints (7b), as described below with reference to FIG. 3.

Figure 3:
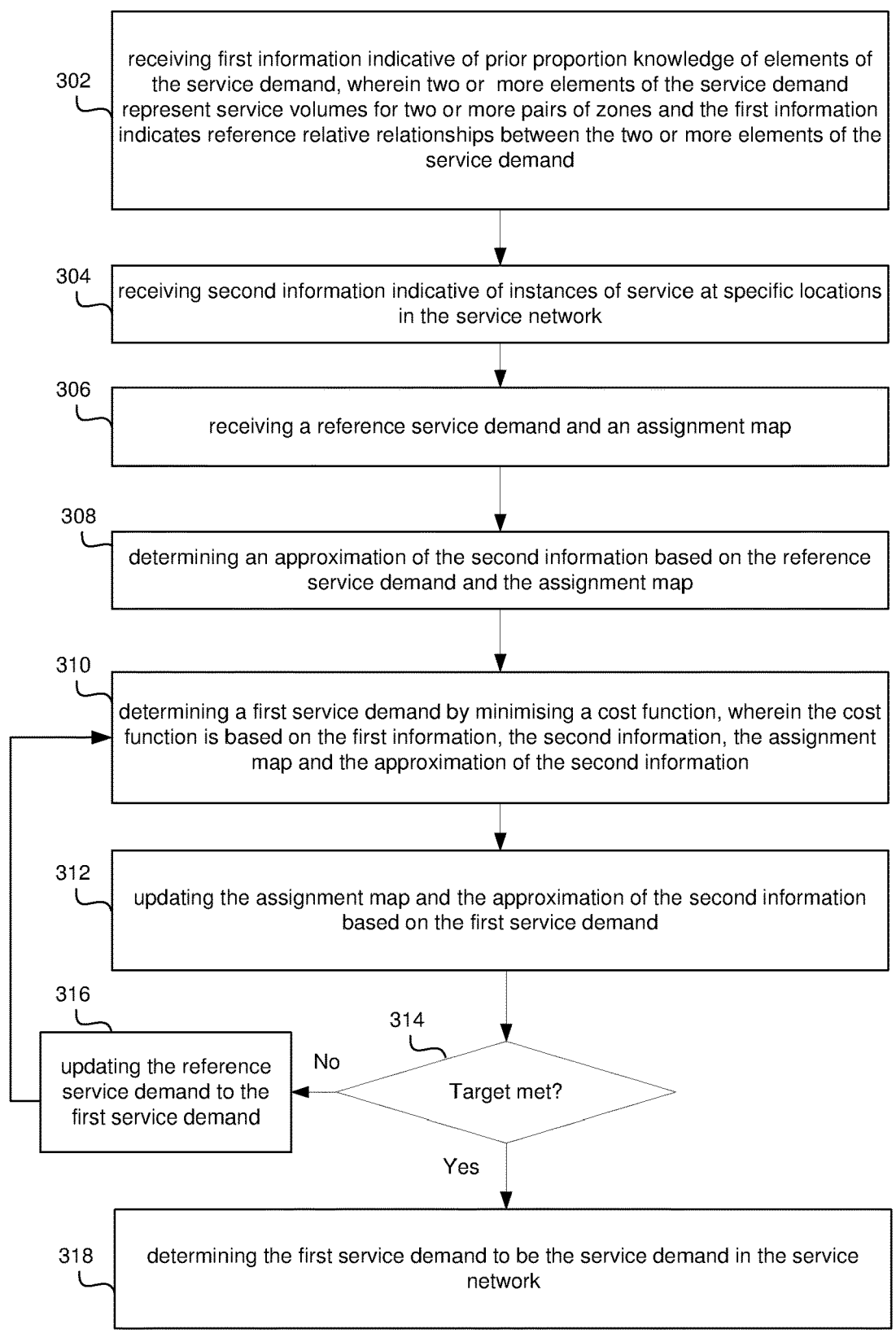
FIG. 3 illustrates an another example method for determining a service demand in the service network in accordance with the present disclosure.

FIG. 3 illustrates an example method 300 of determining a service demand in a service network.

The method 300 receives 302 first information G indicative of prior proportion knowledge of elements of the service demand X, wherein two or more elements of the service demand X represent service volumes for two or more pairs of zones and the first information indicates reference relative relationships between the two or more elements of the service demand X.

The method 300 also receives 304 second information ∇ indicative of instances of service at specific locations in the service network 100.

The method 300 further receives 306 a reference service demand and an assignment map P corresponding to the reference service demand.

According to equation (7c), the method 300 determines 308 an approximation V of the second information ∇ based on the reference service demand and the assignment map P.

The method 300 determines 310 a first service demand $X_1$ by optimising, particularly, minimising, the cost function shown in equation (7a). As described above, the cost function (7a) is based on the first information G, the second information ∇, the assignment map P and the approximation V of the second information ∇.

The method 300 updates 312 the assignment map P and the approximation V of the second information ∇ based on the first service demand $X_1$ according to equation (7c).

The method 300 then determines 314 if a measure of match between the first service demand $X_1$ and the reference service demand meets a target, which is referred to as a "convergence test", for example, determining if a difference between the first service demand $X_1$ and the reference service demand is less than a threshold.

If the measure of match does not meet the target, which means the difference between the first service demand $X_1$ and the reference service demand is not less than the threshold, the method 300 updates 316 the reference service demand to the first service demand $X_1$. That is, the first service demand $X_1$ determined in a previous iteration will be used as the reference service demand in the next iteration. The method 300 further performs the next iteration by repeating steps 310 and 314.

In the next iteration, a first service demand $X_1$ is determined at step 310 based on the updated assignment map P and the updated approximation V of the second information ∇. The convergence test is performed again at step 314 in the next iteration based on the reference service demand, which is the first service demand $X_1$ determined in the previous iteration, and the first service demand $X_1$ determined in the next iteration.

The methods 300 iteratively performs steps 310 and 312 until the target is met in the convergence test at step 314, which means the difference between the first service demand $X_1$ and the reference service demand is less than the threshold. In this case, the method 300 determines 318 the service demand X in the service network 100 based on the first service demand $X_1$ and the reference service demand. For example, the method 300 can determine the average of the first service demand $X_1$ and the reference service demand used in the latest convergence test at step 314 to be the service demand X, or simply choose the first service demand $X_1$ used in the latest convergence test at step 314 as the service demand X.

The method 300 can also determine a measure of goodness-of-fit to indicate the match between the first information G and the service matrix X. The goodness-of-fit may be measured by different ways, one of which is coefficient of determination $R^2$ that shows the how well the service matrix X fits the first information G.

Hardware System

Figure 4:
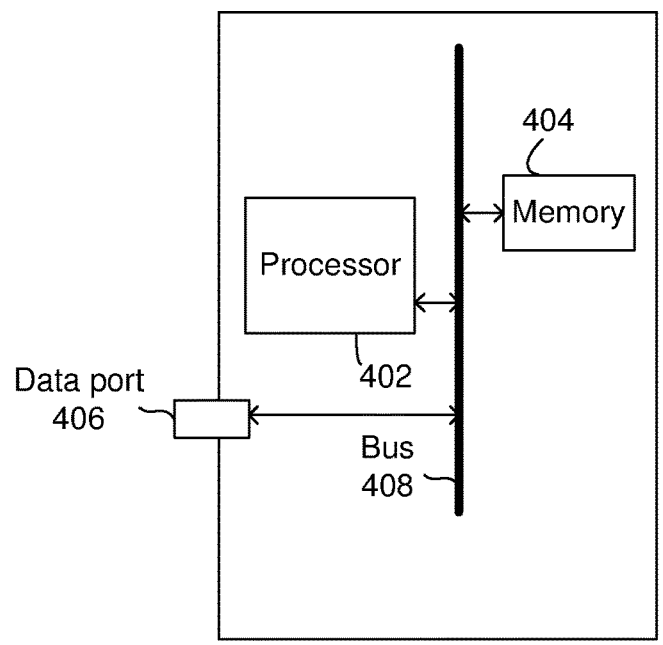
FIG. 4 illustrates an example computer system for determining a service demand in the service network in accordance with the present disclosure.

FIG. 4 illustrates a computer system 400 for determining a service demand in a service network. The computer system 400 comprises a processor 402, a program memory 404, a data port 406. The processor 402, the program memory 404 and the data port 406 are connected together via a bus 408. The program memory 404 is a non-transitory computer readable medium, such as a hard drive, a solid state disk or CD-ROM. A set of computer-executable instructions, that is, an executable software program stored on the program memory 404 causes the processor 402 to perform the methods described with reference to FIGS. 2 and 3 and other methods described in the present disclosure.

In an example, the data port 406 is configured to receive first information indicative of prior proportion knowledge of elements of the service demand, and second information indicative of instances of service at specific locations in the service network, wherein two or more elements of the service demand represent service volumes for two or more pairs of zones and the first information indicates reference relative relationships between the two or more elements of the service demand.

These information are sent to the processor 402 via the bus 408. The processor 402 is configured to determine the service demand by optimising, particularly, minimising, a cost function, wherein the cost function is based on the first information and the second information. As described above, the cost function (7a) is based on the first information and the second information.

In another example, the data port 406 is configured to receive first information indicative of prior proportion knowledge of elements of the service demand, wherein two or more elements of the service demand represent service volumes for two or more pairs of zones and the first information indicates reference relative relationships between the two or more elements of the service demand. The data port 406 is further configured to receive second information indicative of instances of service at specific locations in the service network. The data port 406 is further configured to receive a reference service demand and an assignment map corresponding to the reference demand.

These information are sent to the processor 402. The processor 402 is configured to
(a) determine an approximation of the second information based on the reference service demand and the assignment map;
(b) determine a first service demand by optimising, particularly, minimising, the cost function (7a), wherein the cost function (7a) is based on the first information, the second information, the assignment map and the approximation of the second information;
(c) update the assignment map and the approximation of the second information based on the first service demand;
(d) if a measure of match between the first service demand and the reference service demand does not meet a target, updating the reference service demand to the first service demand, and repeating (b) to (c); and
(e) if the measure of match meets the target, determine the first service demand to be the service demand in the service network.

The method steps in the method 200, 300 as shown in FIGS. 2 and 3 and other method steps as described in the present disclosure may be implemented as a computer software program. The computer software includes machine-readable instructions, when executed by a processor in a computer system, the computer software cause the processor to perform these method steps.

Performance Comparison

Figure 5:
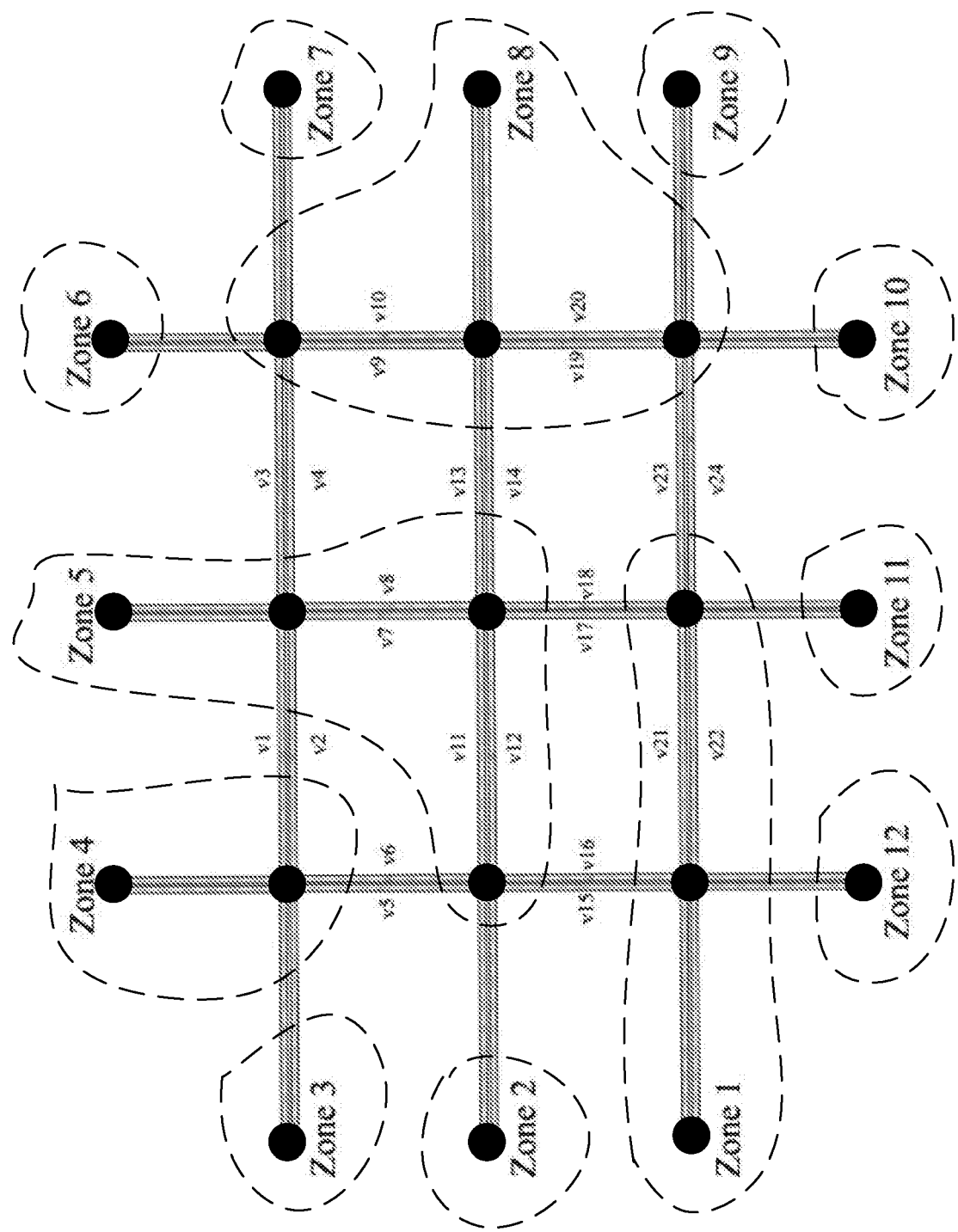
FIG. 5 illustrates another example service network in accordance with the present disclosure.

FIG. 5 illustrates an example a service network 500 in accordance with the present disclosure. A performance comparison is described below with reference to FIG. 5.

In the service network 500, there are 48 links, 21 nodes, 12 zones, 132 OD pairs and 24 service detectors. The dark dots in FIG. 5 represent nodes in the service network 500, and the zone boundaries are shown in dashed lines.

Some properties of the network are described below:
The service network 500 is fully connected. This means any one of the 12 zones is reachable from another one;
among these 12 zones, there are 3 hot-spot zones 1, 5 and 8. This means more services flow in to and out from zones 1, 5 and 8 than other zones; and
among these 132 OD pairs, there is no service detector installed between eight pairs of zone (e.g. zone 3->zone 4, zone 2->zone 5).

Additional assumptions of the scenario are described below:
user equilibrium is a perfect model of trip's route choice behaviors; and
the Bureau of Public Roads (BPR) function is a perfect relationship between service instances and link costs, see (Ortuzar, 2011) for details of the BPR function.

In the present disclosure, the following aspects are explored:
the relationship between the accuracy of prior proportion knowledge G (the first information) and the correctness of the OD matrix X (service demand); and
the effectiveness of the randomized initial OD matrix method.

Prior Proportion Knowledge G and the Unique Optimal OD Matrix X

Assuming the assignment map P is fixed. Given a "try the best" prior proportion knowledge matrix G, the hypothesis as described above guarantees a unique optimal OD matrix X.

The accuracy of G is measured using the R squared value:

$$\Phi(G)=R^2(G,\overline{G}) \quad (13)$$

where $\overline{G}$ is the "true" proportion of the OD pair $x_i$. A larger value of $\Phi(G)$ represents better prior proportion knowledge. In particular, $\Phi(G)=1$ means perfect prior proportion knowledge.

The correctness of the unique optimal OD matrix X is measured as follows:

$$\Phi(X)=R^2(X,\overline{X}) \quad (14)$$

where $\overline{X}$ is the "true" OD matrix. A larger value of $\Phi(X)$ represents a better outcome achieved by the methods described above. In particular, $\Phi(X)=1$ means the determined unique optimal OD vector X is the true OD matrix (or a perfect estimation).

The correctness of the approximation V of the observed service instances $\overline{V}$ is measured by the difference between the observed service instances $\overline{V}$ and the approximation V:

$$\Phi(V)=R^2(V,\overline{V}) \quad (15)$$

where $\overline{V}$ is the observed service instances and V is the approximation of the service instances $\overline{V}$. A larger value of $\Phi(V)$ represents a better approximation of the observed service instances $\overline{V}$. In particular, $\Phi(V)=1$ means the approximation V of the observed service instances $\overline{V}$ matches the observed the service instances $\overline{V}$.

In this example, 1000 random prior proportion knowledge matrices G are generated. For each random prior proportion knowledge matrix G, a service demand X is determined based on the observed service instances $\overline{V}$ according to equation (7a) ($\lambda$=0.1). As a result, 1000 OD matrices X and corresponding approximations V of the observed service instances $\overline{V}$ are obtained.

Figure 6:
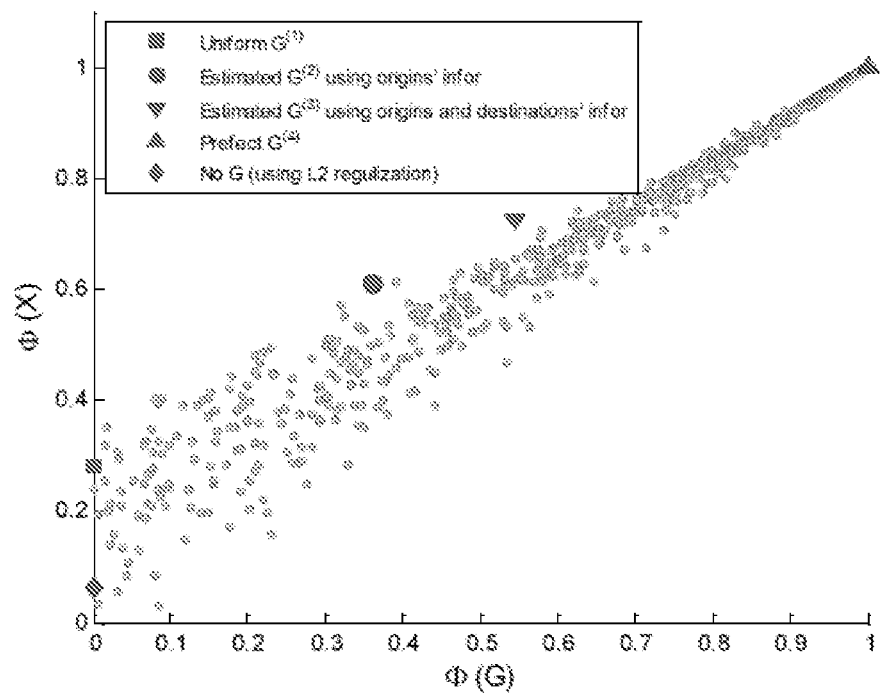
FIG. 6(a) illustrates a relationship between accuracy of prior proportion knowledge and correctness of origin-destination (OD) matrix determined in accordance with the present disclosure.
FIG. 6(b) illustrates a relationship between accuracy of prior proportion knowledge and correctness of approximation of service instances in accordance with the present disclosure.
Figure 6:
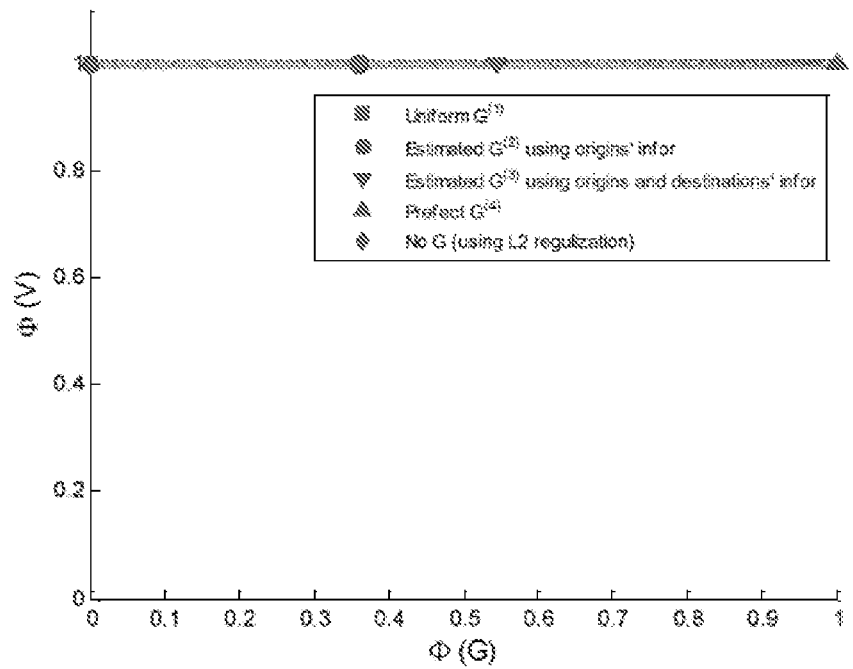

$\Phi(G)$, $\Phi(X)$ and $\Phi(V)$ are calculated according to equations (13), (14) and (15), respectively. The relationship between $\Phi(G)$ and $\Phi(X)$ is shown in FIG. 6(a) and the relationship between $\Phi(G)$ and $\Phi(V)$ are shown in FIG. 6(b).

The results indicate:
$\Phi(G)$ has a strong linear correlation with $\Phi(X)$. If $\Phi(G)$ is larger than 0.7, $\Phi(G)$ and $\Phi(X)$ are close. If $\Phi(G)$ is smaller than 0.7, the service instance conservation constraint guides the hypothesis towards the true OD matrix. This makes $\Phi(X)$ larger than $\Phi(G)$;

if $\Phi(G)=1$, $\Phi(X)=1$. This indicates if a reliable prior proportion knowledge matrix G is available, the unique optimal OD matrix determined by the method is the true OD matrix. Thus, an accurate total number of service instances becomes less important; and referring to the 1000 OD matrices X determined as above, some of them are close to the true OD matrix; while some of them are significantly different from the true OD matrix. However, all these OD matrices X match service instances V well since $\Phi(V) \approx 1$. This confirms the problem of indeterminacy.

In addition to these 1000 random prior proportion knowledge matrices G, a number of typical prior proportion knowledge matrices are evaluated in order to reflect the availability of real-world dataset:

Uniform $G^{(1)}$: this prior proportion knowledge matrix G applies if no data is available to estimate prior proportion knowledge and zones in the service network are assumed to be homogeneous;

$G^{(2)}$, estimated using origin zone information: zones in the service network are heterogeneous zones and information about origin zones is available. In reality, it is usually not hard to find information about origin zones, e.g. the population, to estimate prior proportion knowledge. In this example, accurate information about the proportion of service volumes from origin zones is used;

$G^{(3)}$, estimated using origin and destination zone information: the zones in the service network are heterogeneous and information about both origin zones and destination zones are available. In reality, the information about destination zones is difficult to obtain. In this example, proportions of service volumes to hot-spot zones 1, 5 and 8 are three times as much as proportions of service volumes to other zones. This means only a rough knowledge of destination zones is available;

Perfect $G^{(4)}$: used for theoretical analysis. In reality, a perfect G is not available in most cases; and $l_2$ regularization: used for theoretical analysis.

The results corresponding to the above five typical G are also shown in FIGS. 6(a) and 6(b). The results indicate:

if a uniform $G^{(1)}$ is used, $\Phi(V)$ is close to 1.0. However, the determined OD matrix X is far away from the true OD matrix since $\Phi(X)=0.28$. This is because the three hot-spot zones 1, 5 and 8 generates and attracts more service volumes than other zones, which makes the uniform prior proportion knowledge represented by $G^{(1)}$ no longer applicable;

if $G^{(2)}$ is used, $\Phi(V)$ is close to 1.0. The value of $\Phi(X)$ is significantly improved from 0.28 to 0.61. This shows the benefit of including the origin zone information in the prior proportion knowledge matrix G;

if $G^{(3)}$ is used, the value of $\Phi(X)$ is further improved from 0.61 to 0.73. This shows the benefit of including the destination zone information in prior proportion knowledge matrix G, even if only a rough knowledge of destination zones is available;

if the perfect $G^{(4)}$ is used, both $\Phi(V)$ and $\Phi(X)$ are 1.0. In this case, the determined OD matrix X is the true OD matrix; and if $l_2$ regularization is used, $\Phi(V)$ is also close to 1.0. However, the determined OD matrix X is far away from the true OD matrix. This means $l_2$ regularization does not produce a good result.

Figure 7:
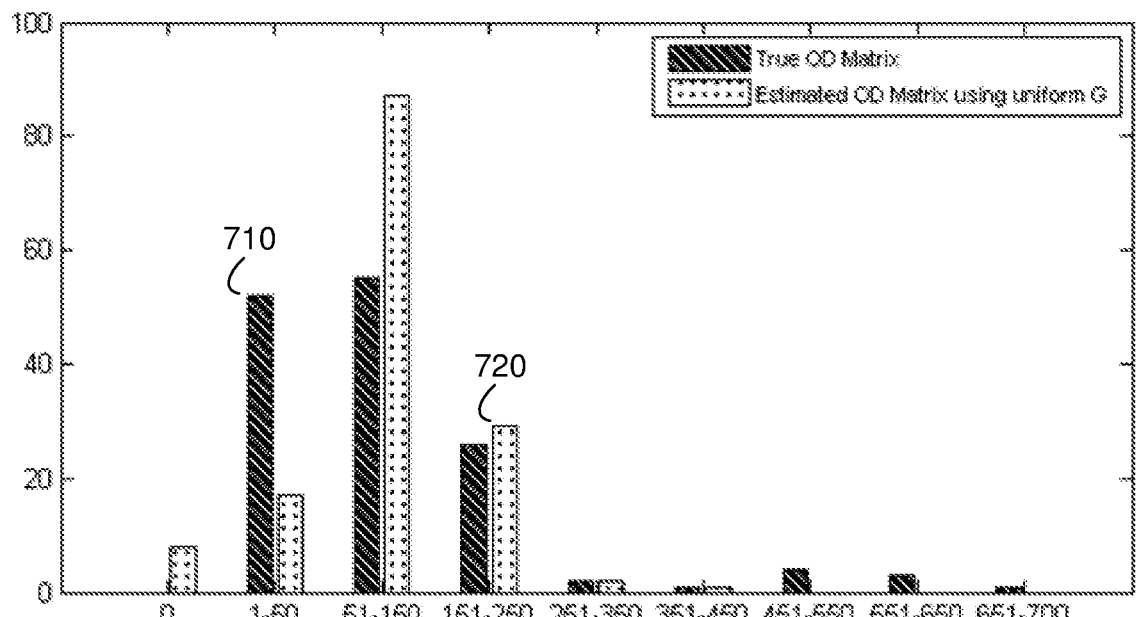
FIG. 7(a) illustrates a histogram of an OD matrix determined using uniform G and a histogram of the true OD matrix.
FIG. 7(b) illustrates a histogram of an OD matrix determined using L2 regularization and the histogram of the true OD matrix.
FIG. 7(c) illustrates a histogram of an OD matrix determined using origin zone information and the histogram of the true OD matrix.
FIG. 7(d) illustrates a histogram of an OD matrix determined using origin and destination zone information and the histogram of the true OD matrix.
Figure 7:
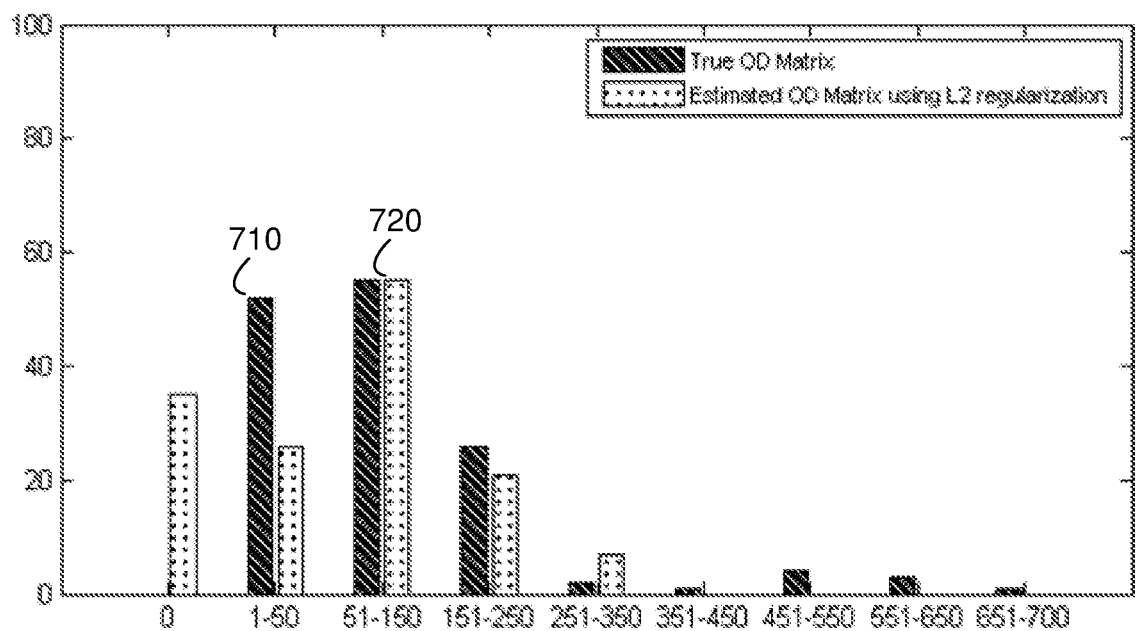
Figure 7:
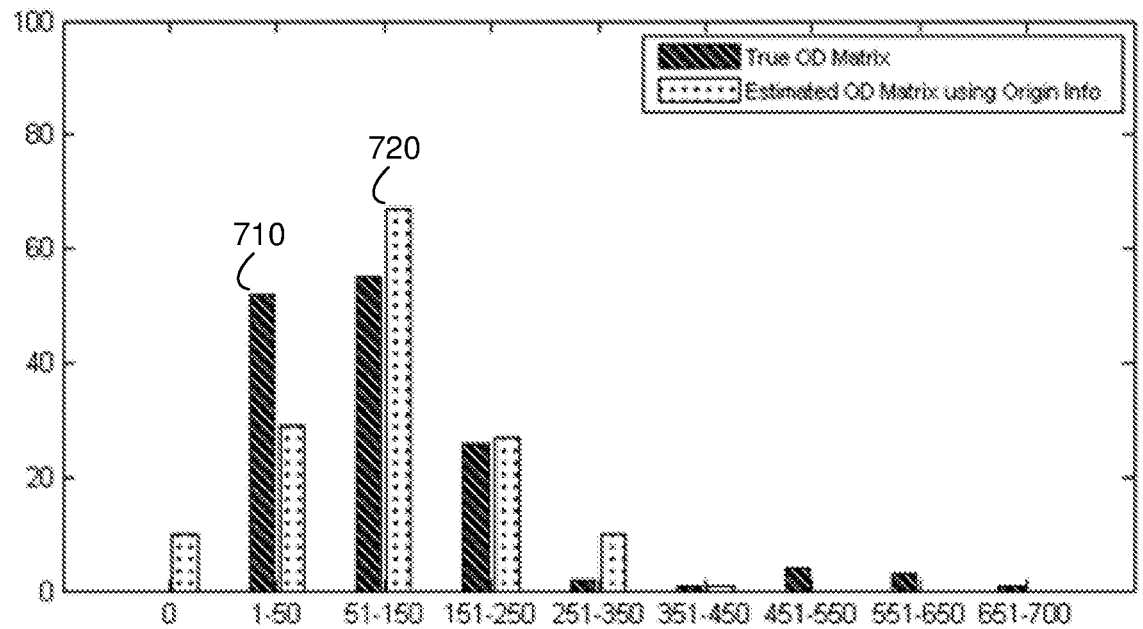
Figure 7:
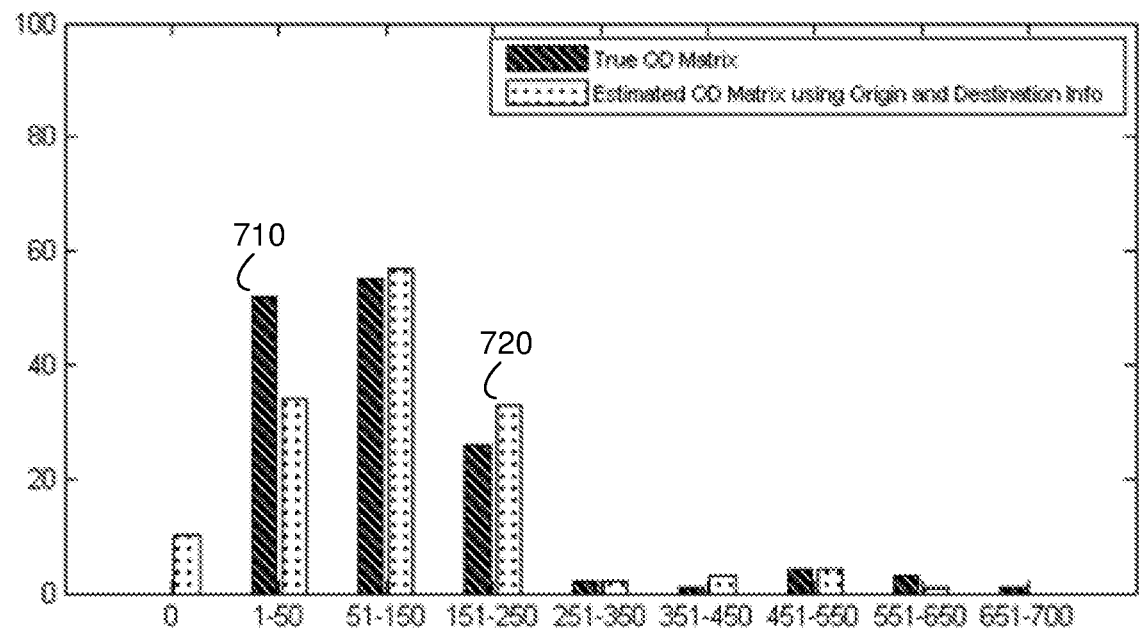

FIGS. 7(a) to 7(d) illustrate histograms of the determined OD matrices and the true OD matrix, in which the histograms of the determined OD matrices X are compared with the histograms of the true OD matrix. FIG. 7(a) illustrates a histogram of an OD matrix determined using uniform G, FIG. 7(b) illustrates a histogram of an OD matrix determined using L2 regularization, FIG. 7(c) illustrates a histogram of an OD matrix determined using origin zone information, and FIG. 7(d) illustrates a histogram of an OD matrix determined using origin and destination zone information.

In FIGS. 7(a) to 7(d), hatched bars represent histograms 710 of the true OD matrix, and dotted bars represent histograms 720 of the OD matrices X determined as above. The X-coordinate represents the value ranges of service volumes and the Y-coordinate represents the frequency of service volumes in each value range. FIGS. 7(a) to 7(d) indicate:

uniform $G^{(1)}$ and $l_2$ regularization prevent the hypothesis to match a small portion of high-value service volumes. Therefore, uniform $G^{(1)}$ and $l_2$ regularization are not suitable for large-scale service network, which may have a small number of hot-spot zones;

by using additional information about origin zones and destination zones, the hypothesis matches better the small portion of high-value service volumes. However, due to the lack of accurate information about destinations, the hypothesis does not perfectly match high-value service volumes; and In this example, there are no zero service volume in the true OD matrix. The minimum service volume in the true OD matrix is seven. However, the determined OD matrix X in all the five scenarios has a substantial number of zero elements. In particular, $l_2$ regularization outputs 35 zeroes in the 132 elements or OD pairs. For those 8 OD pairs (e.g. zone 3->zone 4) where there is no service detector installed, $l_2$ regularization outputs zeroes. This does not happen in other scenarios. This means that if there are a large portion of OD pairs without service detectors, $l_2$ regularization is not a valid method.

Service planning, service redesign and/or service management in a service network may be implemented based on the service demands or OD matrices determined herein. For example, the service demand or OD matrix may be output by the computer system to assist in service planning, service redesign and/or service management.

In one example, the service demand or OD matrix is displayed on a display to indicate the level of service demand in the service network. Details based on the service demand or OD matrix may be displayed with details of the service network, such as a map of the service network, including, for example, the zones. In one example, a heat map based on the service demand or OD matrix may be overlaid with a map of the service network. Locations of high demand may be indicated as hotspots on the map. In one example, the service demand or OD matrix is output to a geographic information system (GIS). The GIS may be used for planning, designing or managing the service network and may display details or visualisations based on the service demand or OD matrix with details or visualisations of the service network, as discussed above.

In some embodiments, the service network may be altered automatically or manually to influence the demand in parts of the service network. For example, in a computer network, the service network may be altered automatically, for example, by rerouting traffic or opening ports. In another example, aspects of a traffic network such as traffic light systems may be controlled automatically to ease congestion. In some embodiments, alerts may be output from the computer system to indicate locations of high demand in the service network. For example, instructions may be transmitted to devices of people controlling or managing parts of the service network to adjust aspects of the service network, such as when managing people traffic for an event.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimising" or "determining" or "displaying" or "minimising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

REFERENCES

Beckmann, M. J., McGuire, C. B. and Winsten, C. B., 1956. Studies in the Economics of Transportation. Yale University Press. New Haven, Conn.
Ben-Akiva M., Gao S., Wei Z. and Wen Y., 2012. A dynamic traffic assignment model for highly congested urban networks. Transportation Research Part C: Emerging Technologies 24, 62-82.
Bell, M. G. H., 1991. The estimation of origin-destination matrices by constrained generalized least squares. Transport Research 25B, 13-22.
Bera, S. and Rao K. V. K., 2011. Estimation of origin-destination matrix from traffic counts: the state of the art. European Transport 49, 3-23.
Bierlaire, M., 2002. The total demand scale: A new measure of quality for static and dynamic origin-destination trip tables. Transportation Research Part B: Methodological 36B, 755-851.
Bishop, C. M., 2006. Pattern Recognition and Machine Learning. Springer. Cascetta, E., 1984. Estimation of trip matrices from traffic counts and survey data: A generalized least squares estimator. Transportation Research Part B: Methodological 18 (4-5), 289-299.
Cascetta, E. and Nguyen, S., 1988. A unified framework for estimating or updating origin/destination matrices from traffic counts. Transportation Research Part B: Methodological 22 (6), 437-455.
Cascetta, E., Papola, A., Marzano, V., Simonelli, F. and Vitiello, I., 2013. Quasi-dynamic estimation of OD flows from traffic counts: Formulation, statistical validation and performance analysis on real data. Transportation Research Part B: Methodological 55 (0), 171-187.
Donoho, D., 2006. Compressed sensing. IEEE Transactions on Information Theory 52 (4), 1289-1306.
Frank, M., Wolfe, P., 1956. An algorithm for quadratic programming. Naval Research Logistics Quarterly, 3, 95-110.
Hazelton, M. L., 2003. Some comments on origindestination matrix estimation, Transportation Research Part A: Policy and Practice 37 (10), 811-822.
Highway Capacity Manual, 2000. Transportation Research Board, Washington, D.C. Inoue, H., 1977. Test of accuracy of OD survey and its correction by screen line survey. Traffic Engineering 12(6), 11-19 (in Japanese).
Maher, M. J., 1983. Inferences on trip matrices from observations on link volumes: A Bayesian statistical approach. Transportation Research Part B: Methodological 17 (6), 435-447.
Menon, A. K., Cai C., Wang W., Wen T. and Chen F., 2015. Fine-Grained OD Estimation with Sparsity Regularisation, Transportation Research Part B: Methodological (to be published)
Ortuzar, J. D. and Willumnsen, L. G., 2011. Modeling Transport, 4th Edition. John Wiley and Sons, New York.
Parry, K. and Hazelton, M. L., 2012. Estimation of origin-destination matrices from link counts and sporadic routing data. Transportation Research Part B: Methodological, 46 175-188.
Sanandaji, B. M. and Varaiya, P. P., 2014. Compressive origin-destination matrix estimation. CoRR abs/1404.3263.
Spiess, H., 1987. A maximum likelihood model for estimating origin-destination matrices. Transportation Research Part B: Methodological 21 (5), 395-412.
Van-Zuylen, H. and Willumsen, L., 1980. The most likely trip matrix estimated from traffic counts. Transportation Research Part B 14 (3), 281-293.
Wang, M., Xu, W. and Tang, A., 2011. A unique "nonnegative" solution to an underdetermined system: From vectors to matrices. Signal Processing, IEEE Transactions on 59 (3), 1007-1016.
Wright, S. J., Nocedal J., 1999. Numerical Optimization (Chapter 17), Springer, Berlin. Yang, H., Sasaki, T., Iida, Y. and Asakura, Y., 1992. Estimation of origin-destination matrices from link traffic counts on congested networks. Transportation Research Part B: Methodological 26 (6), 417-434.

The invention claimed is:
1. A computer-implemented method for determining a service demand in a transport network, wherein two or more elements of the service demand represent traffic volumes for two or more pairs of zones in the transport network, the method comprising:
receiving first information indicative of prior proportion knowledge wherein the prior proportion knowledge comprises a proportion of traffic volume for a pair of zones of the transport network relative to the sum of traffic volumes in the transport network;

receiving, from one or more service detectors, second information indicative of instances of number of vehicles recorded at specific locations in the transport network;

determining the service demand by minimising a cost function that is convex with respect to the elements of the service demand, wherein the cost function comprises a first measure of match between the service demand and a reference service demand, wherein the reference service demand is calculated based on the service demand and the first information, and wherein the cost function further comprises a second measure of match between the second information and an approximation of the second information; and altering the transport network to reroute traffic in response to the determined service demand.

2. The computer-implemented method according to claim 1, wherein the first measure of match is scalable.

3. The computer-implemented method according to claim 1, wherein the approximation of the second information is calculated based on an assignment map and the service demand.

4. The computer-implemented method according to claim 1, wherein the first information is determined based on census data or household survey data.

5. The computer-implemented method according to claim 1, wherein the one or more service detectors are installed in the transport network.

6. A computer-implemented method for determining a service demand in a transport network, wherein two or more elements of the service demand represent traffic volumes for two or more pairs of zones in the transport network, the method comprising:

(a) receiving first information indicative of prior proportion knowledge, wherein the prior proportion knowledge comprises a proportion of traffic volume for a pair of zones of the transport network relative to the sum of traffic volumes in the transport network;

(b) receiving from one or more service detectors, second information indicative of instances of number of vehicles recorded at specific locations in the transport network;

(c) receiving a reference service demand and an assignment map;

(d) determining a first service demand by minimising a cost function that is convex with respect to the elements of the first service demand, wherein the cost function comprises a first measure of match between the first service demand and the reference service demand, wherein the reference service demand is calculated based on the first service demand and the first information, and wherein the cost function further comprises a second measure of match between the second information and an approximation of the second information, wherein the approximation of the second information is calculated based on the first service demand and the assignment map;

(e) updating the assignment map and the approximation of the second information based on the first service demand;

(f) if a measure of match between the first service demand and the reference service demand does not meet a target, updating the reference service demand to the first service demand, and repeating (d) to (e);

(g) if the measure of match meets the target, determining the first service demand to be the service demand in the transport network; and (h) altering the transport network to reroute traffic in response to the determined service demand.

7. A non-transitory computer-readable medium, including computer executable instructions stored thereon that, when executed by a processor, causes the computer to perform the method of claim 1.

* * * * *